United States Patent
Inoue et al.

(10) Patent No.: US 6,398,413 B1
(45) Date of Patent: Jun. 4, 2002

(54) SPINDLE MOTOR UNIT HAVING HYDRODYNAMIC BEARING

(75) Inventors: Hiroshi Inoue, Osaka; Masashi Omura, Hyogo, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/689,763

(22) Filed: Oct. 13, 2000

(30) Foreign Application Priority Data

Oct. 15, 1999 (JP) .......................................... 11-293308

(51) Int. Cl.$^7$ ............................................... F16C 32/06
(52) U.S. Cl. ....................................... 384/112; 384/123
(58) Field of Search ................................ 384/112, 123, 384/113, 107, 124

(56) References Cited

U.S. PATENT DOCUMENTS

| 5,993,066 A | * | 11/1999 | Leuthold et al. | 384/113 |
| 6,059,459 A | * | 5/2000 | Ichiyama | 384/112 |
| 6,211,592 B1 | * | 4/2001 | Ishiyama | 384/113 |

* cited by examiner

*Primary Examiner*—Lenard A. Footland
(74) *Attorney, Agent, or Firm*—Wenderoth, Lind & Ponack, L.L.P.

(57) ABSTRACT

A spindle motor unit having a hydrodynamic bearing that retains a necessary amount of lubricant in the thrust bearing even when rotating and stopping operations are frequently repeated, and ensures reliability of the bearing, and allows correct recording and reproducing operations is obtained by reducing the clearance formed between the inner diameter surfaces 11$d$ and 11$e$ of base 11 and the outer diameter surface of flange 13.

1 Claim, 4 Drawing Sheets

SPINDLE MOTOR UNIT HAVING HYDRODYNAMIC BEARING

FIELD OF THE INVENTION

The present invention relates to a spindle motor unit having a hydrodynamic bearing that can be used for a hard disk, and the like.

BACKGROUND OF THE INVENTION

A conventional spindle motor unit having a hydrodynamic bearing is described below. FIG. 3 is a cross sectional view of a conventional spindle motor unit having a hydrodynamic bearing used for a hard disk. FIG. 4 is a cross sectional view, on an enlarged scale, of a portion of the spindle motor shown in FIG. 3. In FIGS. 3 and 4, base 1 has radial bearing 1a, radial bearing escape 1b, and thrust support 1c. Rotating shaft 2 that co-axially rotates with respect to base 1 is inserted in the radial bearing 1a. Flange 3 is secured to the lower end of rotating shaft 2 by machine screw 4. Flange 3 has recess 3a for housing the head of machine screw 4, and herringbone grooves 3b and 3c on the top and bottom faces of the flange, respectively.

Herringbone grooves 3b and 3c are configured as a pump-in type. This configuration of grooves pushes lubricant 6 with larger force in the direction of the center of rotation than in the outward direction so that centrifugal force caused by rotation will not leak lubricant 6 out. Plate 5 is secured to the bottom face of base 1 by a machine screw. Plate 5 has thrust support 5a in a position opposed to herringbone grooves 3c on flange 3. Lubricant 6 exists in the clearance between radial bearing 1a and rotating shaft 2, the clearance between thrust support 1c on base 1 and herringbone grooves 3b on flange 3, and the clearance between herringbone grooves 3c on flange 3 and thrust support 5a on plate 5. Hub 7 with magnetic disks 8 mounted thereon is fixed to rotating shaft 2.

In a spindle motor unit having a hydrodynamic bearing structured above, a rotating body including magnetic disks 8 and rotating shaft 2 floats up in a predetermined position during its rotation; thus such information as picture, audio, and text, is recorded into magnetic disks 8 or recorded information is reproduced from magnetic disks 8 through a magnetic head (not shown). However, when lubricant 6 existing in herringbone grooves 3b and 3c is reduced to an amount less than necessary, the rotating body does not floats up in the predetermined position and thus the magnetic head can not put information into magnetic disks 8 or reproduce it therefrom correctly. Therefore, lubricant 6 in the herringbone grooves must be kept to an amount not less than necessary even when rotating and stopping operations are frequently repeated. It is, therefore, an object of the present invention to provide a spindle motor unit having a hydrodynamic bearing in which a necessary amount of lubricant 6 is retained in the herringbone grooves even when rotating and stopping operations are frequently repeated.

SUMMARY OF THE INVENTION

In the spindle motor unit having the hydrodynamic bearing of the present invention, the inner diameter surface of the base opposed to the outer diameter surface of the flange has a stepped shape in which its center diameter is larger than its upper and lower diameters. In addition, the clearance formed between the upper and lower parts of this inner diameter surface and the outer diameter surface of the flange is reduced. This structure allows a necessary amount of lubricant to be retained in the herringbone grooves even when rotating and stopping operations are frequently repeated. Thus a spindle motor unit having a hydrodynamic bearing that ensures reliability as a thrust bearing and performs correct recording and reproducing operations can be obtained.

DETAILED DESCRIPTION OF THE PREFERRED EMBODIMENT

Figure 1:
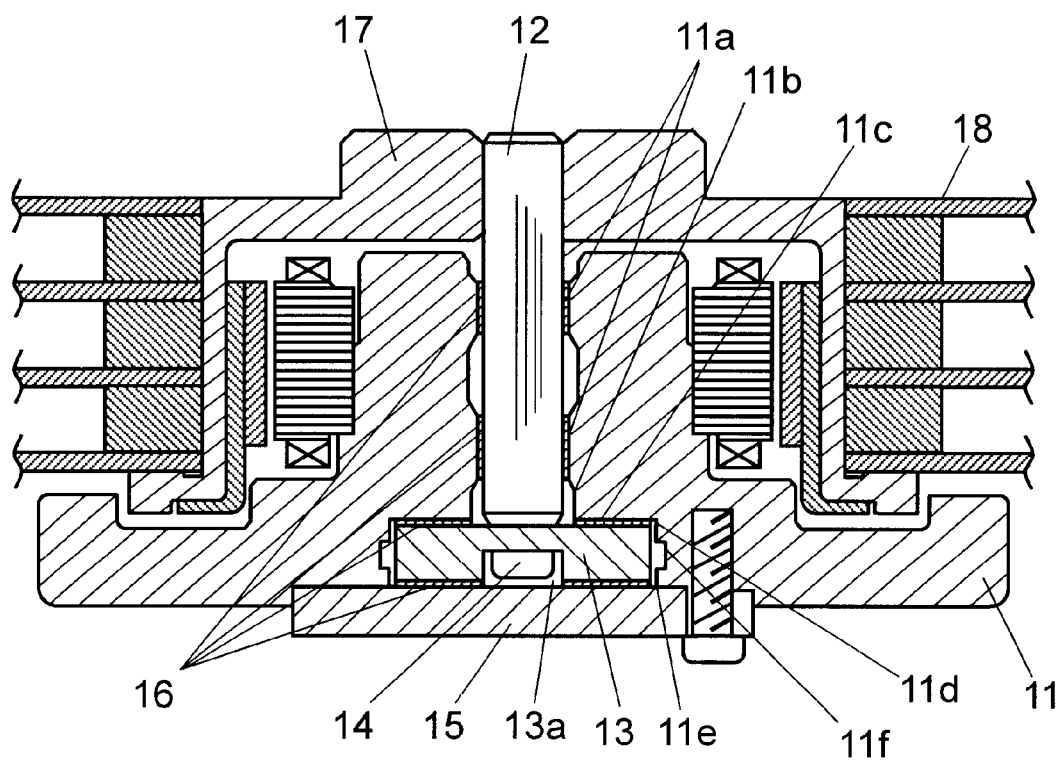
FIG. 1 is a cross sectional view of a spindle motor unit having a hydrodynamic bearing in accordance with an exemplary embodiment of the present invention.
Figure 2:
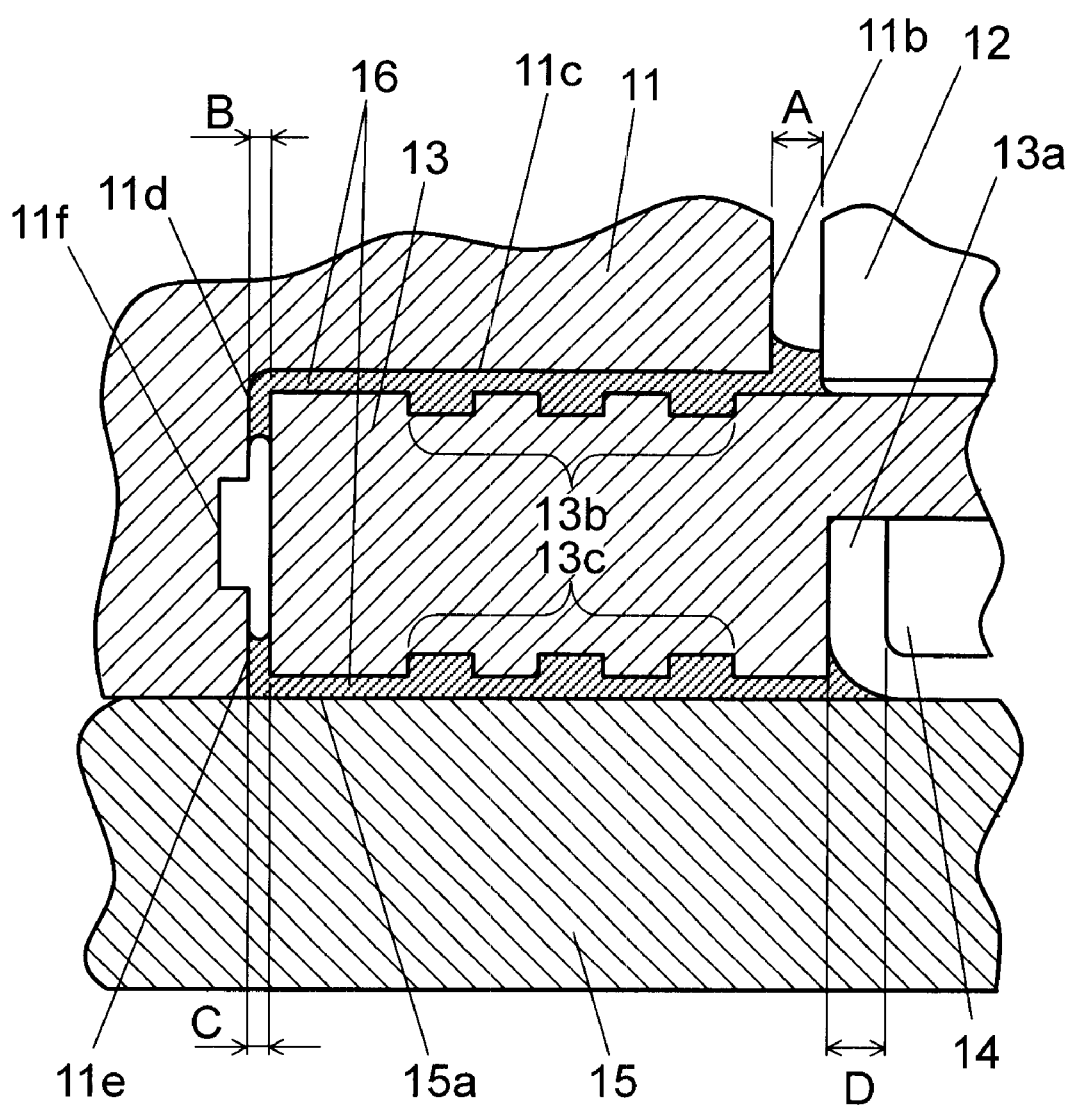
FIG. 2 is a cross sectional view, on an enlarged scale, of a portion near the bearing of the spindle motor unit having the hydrodynamic bearing shown in FIG. 1.
Figure 3:
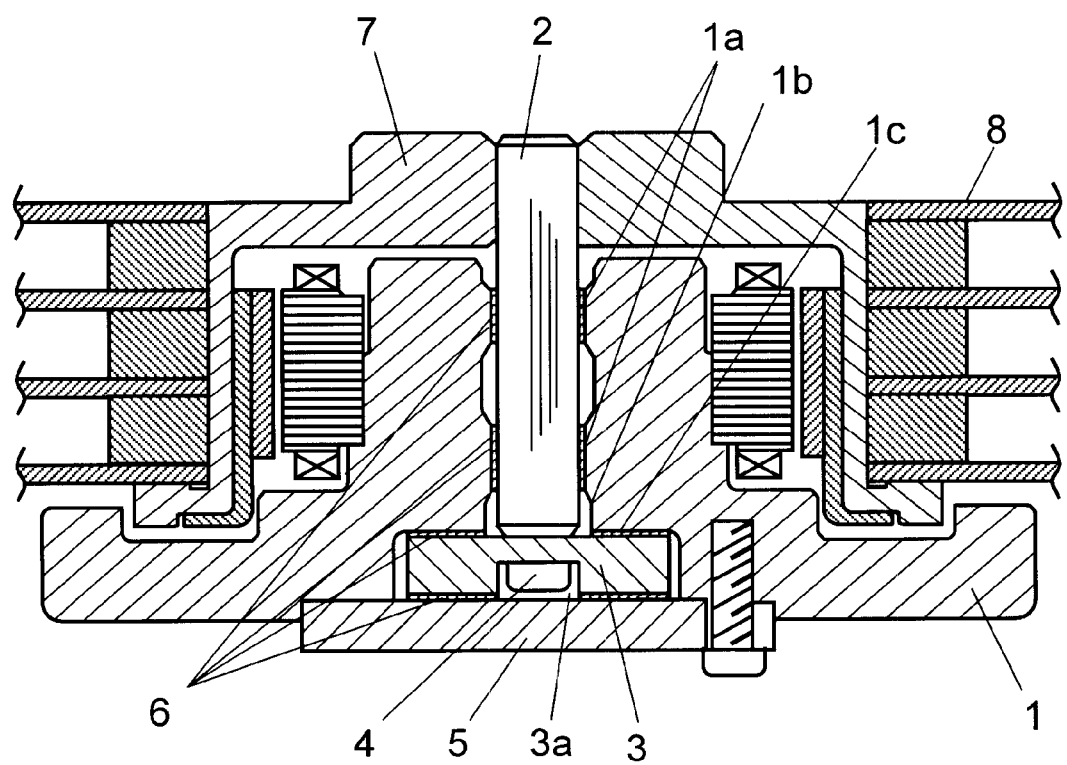
FIG. 3 is a cross sectional view of a conventional spindle motor unit having a hydrodynamic bearing.
Figure 4:
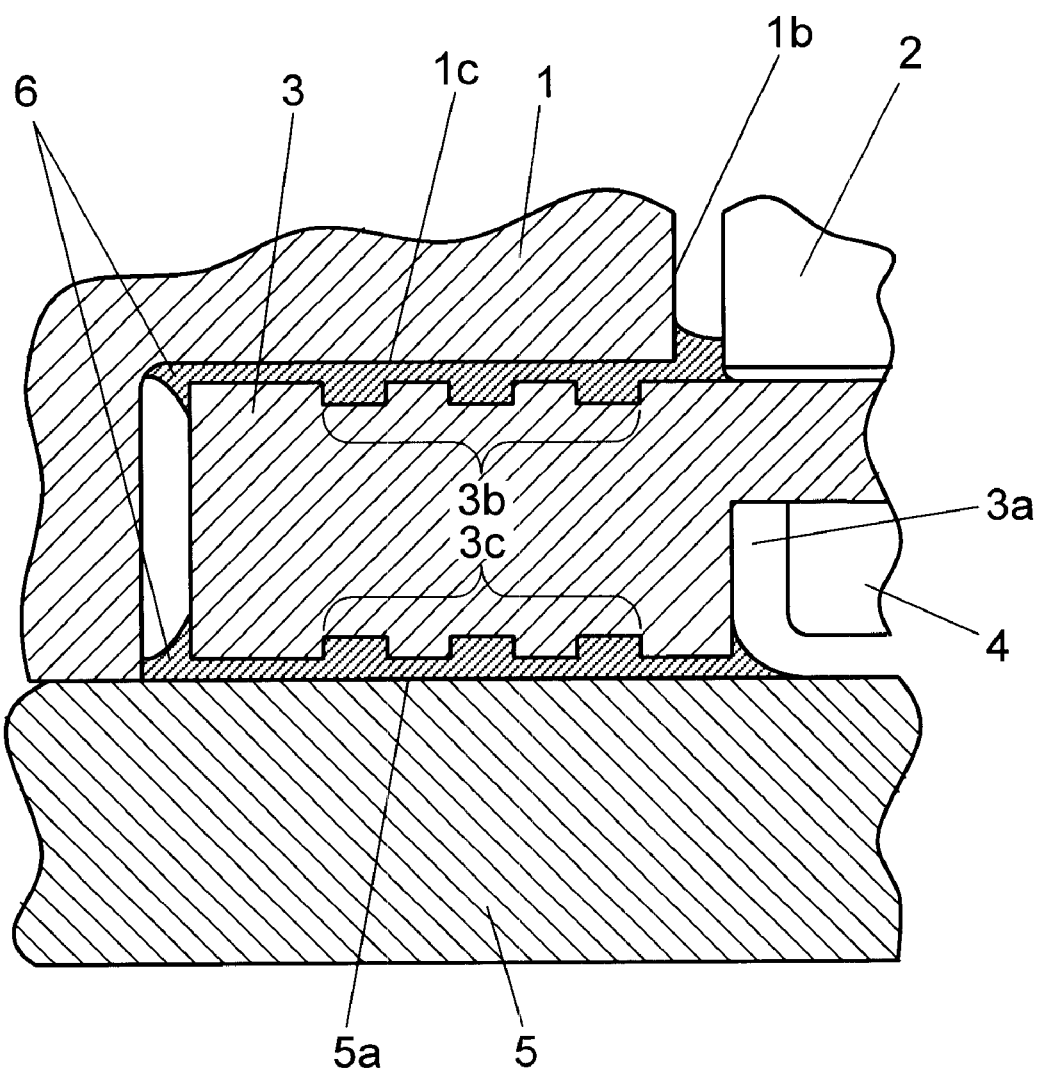
FIG. 4 is a cross sectional view, on an enlarged scale, of a portion near the bearing of the spindle motor unit having the hydrodynamic bearing shown in FIG. 3.

With reference to FIGS. 1 and 2, an exemplary embodiment of the present invention is described below. FIG. 1 is a cross sectional view of a spindle motor unit having a hydrodynamic bearing in accordance with an exemplary embodiment of the present invention. FIG. 2 is a cross sectional view, on an enlarged scale, of a portion of the motor unit shown in FIG. 1. In FIGS. 1 and 2, base 11 has radial bearing 11a, radial, bearing escape 11b, thrust support 11c, inner diameter surfaces 11d and 11e of the base, and inner diameter escape 11f of the base. The face on which thrust support 11c is provided is referred to as a first bottom face and the face joined to plate 15 a second bottom face. Rotating shaft 12 that co-axially rotates with respect to base 11 is inserted in the radial bearing 11a. Flange 13 is secured to the lower end of rotating shaft 12 by machine screw 14. Flange 13 has recess 13a for housing the head of machine screw 14, and herringbone grooves 13b and 13c on the top and bottom faces of the flange, respectively. Herringbone grooves 13b and 13c are configured as a pump-in type. This configuration of grooves pushes lubricant 16 with larger force in the direction of the center of rotation than in the outward direction so that centrifugal force caused by rotation will not leak lubricant 6 out. Plate 15 is secured to the bottom face of base 11 by a machine screw. Plate 15 has thrust support 15a in a position opposed to herringbone grooves 13c on flange 13. Lubricant 16 exists in the clearance between radial bearing 11a and rotating shaft 12, the clearance between thrust support 11c on base 11 and herringbone grooves 13b on flange 13, and the clearance between herringbone grooves 13c on flange 13 and thrust support 15a on plate 15. Hub 17 rotating at a high speed and having magnetic disks 18 mounted on its periphery is co-axially fixed to rotating shaft 12. Magnetic disks 18 are a recording medium that can record and reproduce information, such as picture, sound, and text, through a magnetic head (not shown). A plurality of magnetic disks, e.g. four in this embodiment, are fixed to the periphery of hub 17 co-axially with rotating shaft 12. An example of magnetic disks 18 is a hard disk generally used for a personal computer. In addition, as shown in FIG. 2, assuming the clearance between radial bearing escape 11b and rotating shaft 12 is A, the clearance between inner diameter surfaces 11d and 11e of the base and the outer diameter surface of flange 13 are B and C, respectively, and the clearance between recess 13a in flange 13 and machine screw 14 is D, relations B<A and C<D hold.

The operation of the spindle motor unit having the hydrodynamic bearing of this embodiment structured above is described. First, information, such as picture, sound, and text, is recorded into magnetic disks 18 or recorded information is reproduced from magnetic disks 18 through a magnetic head by high-speed rotation of shaft 12 together with magnetic disks 18 at a predetermined number of revolutions. Since herringbone grooves 13b and 13c are configured as a pump-in type, during rotation of flange 13 and rotating shaft 12, lubricant 16 existing in the clearances between base 11, flange 13, and plate 15, i.e. in the thrust bearing including herringbone grooves 13b and 13c, moves into clearance A formed between rotating shaft 12 and radial bearing escape 11b in base 11 and clearance D formed between recess 13a in flange 13 and machine screw 14.

However, when flange 13 and rotating shaft 12 stop, since each clearance is set so that relations B<A and C<D hold, capillary phenomenon occurring in clearances B and C forces lubricant 16 that has moved into clearances A and D to return to its original position. That is, the amount of lubricant 16 in the thrust bearing returns to substantially the same as it was before rotation. When lubricant 16 moves from clearances A and D toward the thrust bearing, lubricant 16 in clearances B and C moves toward inner diameter escape 11f of the base. However, since clearances B and C are narrower than that between the inner diameter escape 11f of the base and the outer diameter surface of flange 13, the capillary phenomenon prevents lubricant from moving into inner diameter escape 11f of the base. At this moment, lubricant 16 does not move out of clearance A and D completely and partially remain therein. However, this amount does not affect the amount of lubricant in the thrust bearing and a certain amount of lubricant is ensured in the thrust bearing. This lubricant allows hub 17 with magnetic disks 18 mounted thereon to float up in a predetermined position during the rotation of flange 13 and rotating shaft 12.

As hereinabove described, according to the present invention, a necessary amount of lubricant 16 can be retained in the thrust bearing including herringbone grooves even when rotating and stopping operations of the magnetic disks are frequently repeated. This lubricant allows the rotating body including rotating shaft 12 to float up in a predetermined position during rotation. Thus, with reliability of the bearing maintained, the magnetic head can correctly be positioned with respect to magnetic disks 18, thereby allowing correct recording and reproduction of information such as picture and text.

What is claimed is:

1. A spindle motor unit having a hydrodynamic bearing including:

a base having a radial bearing in a bore diameter section thereof, a first and second bottom faces of different heights, inner diameter surface, and a thrust support on said first bottom face;

a rotating shaft co-axially rotating with respect to said base;

a flange having a recess for securing said flange to a lower end of said rotating shaft using a machine screw, and having herringbone grooves on top and bottom faces thereof;

a plate having a thrust support in a position opposed to the bottom face of said flange, and held on the second bottom face of said base; and lubricant existing between the radial bearing of said base and said rotating shaft, between the thrust support on the first bottom face of said base and the herringbone grooves on the top face of said flange, and between the herringbone grooves on the bottom face of said flange and the thrust support on said plate;

wherein the herringbone grooves on the top and bottom faces of said flange are configured so that said lubricant is pushed with larger force in the direction of center of rotation than in the outward direction;

wherein the inner diameter surface of said base opposed to the outer diameter surface of said flange has a stepped shape in which a center diameter thereof is larger than upper and lower diameters thereof; and wherein assuming a clearance formed between said rotating shaft and the bore diameter near the first bottom face of said base is A, a clearance formed between the outer diameter surface of said flange and upper and lower parts of the inner diameter surface of said base that are opposed to the outer diameter surface of said flange are B and C, respectively, and a clearance formed between the recess. in said flange and the machine screw is D, relations B<A and C<D hold.

* * * * *